United States Patent
Groomes et al.

(10) Patent No.: US 8,215,583 B2
(45) Date of Patent: Jul. 10, 2012

(54) ARTICULATING YOKE MOUNT

(75) Inventors: Kim C. Groomes, Hartland, MI (US); Craig Earl McClure, Waterford, MI (US)

(73) Assignee: Pentastar Aviation, Inc., Waterford, MI (US)

(*) Notice: Subject to any disclaimer, the term of this patent is extended or adjusted under 35 U.S.C. 154(b) by 494 days.

(21) Appl. No.: 12/564,118

(22) Filed: Sep. 22, 2009

(65) Prior Publication Data
US 2010/0072323 A1  Mar. 25, 2010

Related U.S. Application Data

(60) Provisional application No. 61/098,816, filed on Sep. 22, 2008.

(51) Int. Cl.
*B64C 1/00* (2006.01)
(52) U.S. Cl. ............ 244/129.1; 248/201; 248/207; 248/274.1
(58) Field of Classification Search ............ 244/129.1, 244/1 R; 248/201, 207, 274.1, 286.1, 202.1, 248/205.1, 220.21, 222.51, 242, 282.1
See application file for complete search history.

(56) References Cited

U.S. PATENT DOCUMENTS

| | | | |
|---|---|---|---|
| 5,626,320 A | 5/1997 | Burrell et al. | |
| 6,366,672 B1* | 4/2002 | Tsay | 379/446 |
| 6,419,188 B1* | 7/2002 | Chapman, Jr. | 244/118.6 |
| D464,250 S * | 10/2002 | Warner et al. | D8/355 |
| 6,517,040 B1* | 2/2003 | Wen | 248/278.1 |
| 6,588,719 B1* | 7/2003 | Tubach | 248/282.1 |
| 6,935,883 B2* | 8/2005 | Oddsen, Jr. | 439/374 |
| 6,966,533 B1* | 11/2005 | Kalis et al. | 248/316.4 |
| 7,441,981 B2* | 10/2008 | Crain et al. | 403/321 |
| 2004/0118987 A1* | 6/2004 | Matko et al. | 248/282.1 |
| 2011/0068241 A1* | 3/2011 | Suddarth | 248/224.7 |
| 2011/0253855 A1* | 10/2011 | Yu | 248/222.14 |

* cited by examiner

*Primary Examiner* — Christopher P Ellis
(74) *Attorney, Agent, or Firm* — Carlson, Gaskey & Olds PC

(57) ABSTRACT

An articulating yoke mount includes a support plate, a first bracket assembly mounted to the support plate, and a second bracket assembly spaced from the first bracket assembly. A positioning of the support plate is selectively adjustable relative to the first bracket assembly and the second bracket assembly to position the support plate at a desired viewing angle.

17 Claims, 3 Drawing Sheets

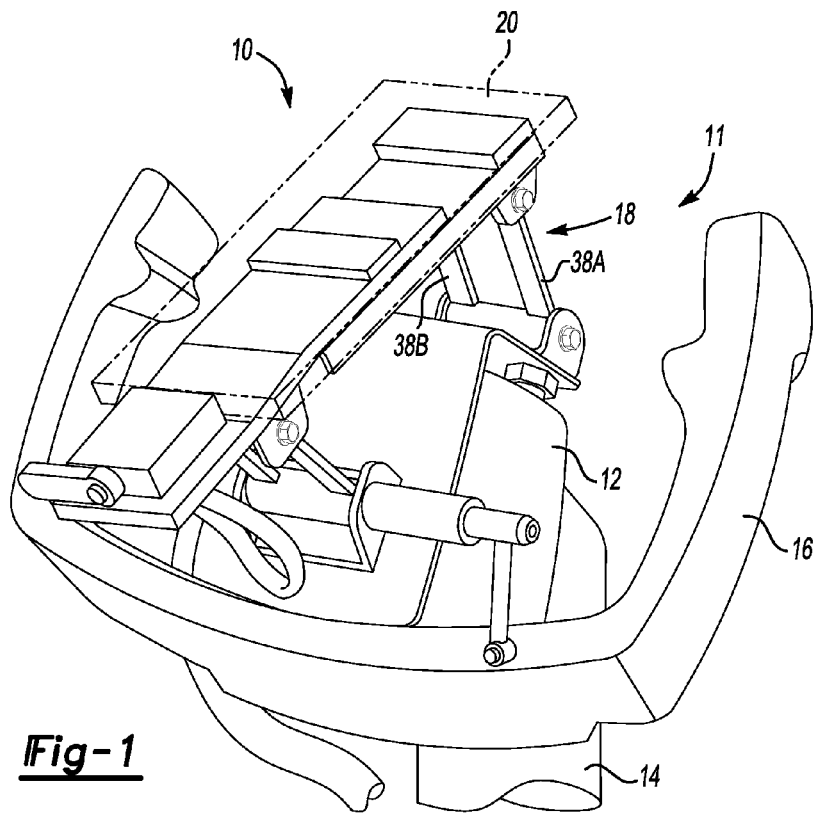
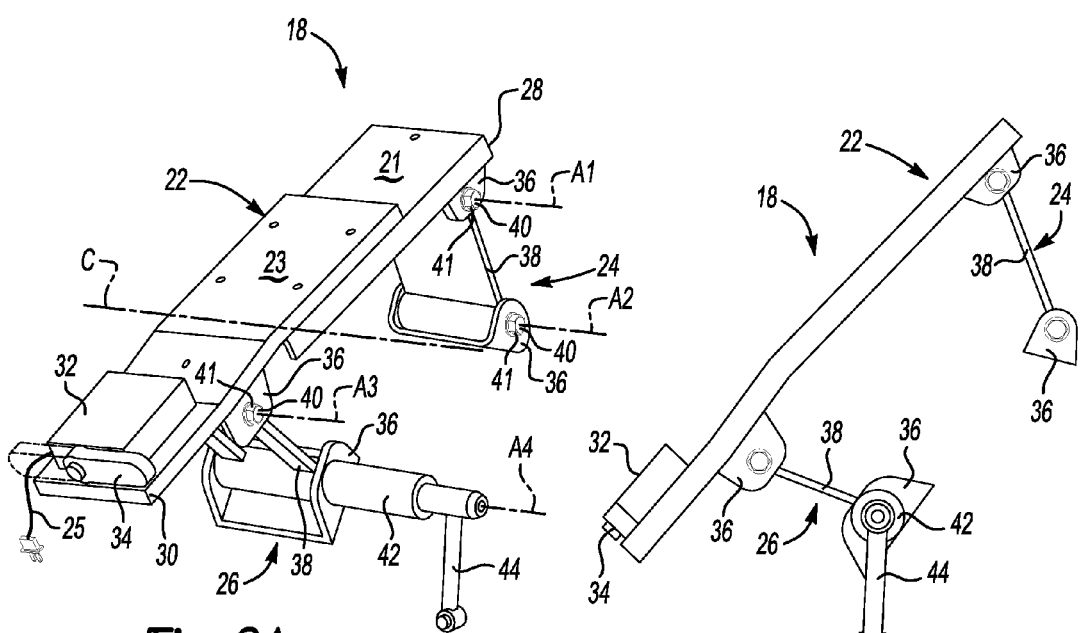
Fig-1
Fig-2A
Fig-2B

ARTICULATING YOKE MOUNT

CROSS REFERENCE TO RELATED APPLICATIONS

This application claims priority to U.S. Provisional Application No. 61/098,816, which was filed on Sep. 22, 2008.

BACKGROUND OF THE DISCLOSURE

This disclosure generally relates to a mount, and more particularly to an articulating yoke mount of an aircraft control yoke assembly.

In recent years, electronic advancements in avionics have developed at a rapid pace. Many modern aircraft now include electronic devices, such as electronic flight bags, for example, that aid flight crews in performing flight management tasks more easily and efficiently. Electronic devices of this type are generally computing platforms that store information such as the aircraft operating manual, the aircrew operating manual, and navigational charts, as well as other information required by the flight crew during flight. These electronic devices also provide a convenient platform for managing flight tasks that reduce, and in many instances replace, paper-based reference material. Removal of paper-based reference material reduces the weight of the aircraft and provides fuel efficiency benefits.

Yoke mounts are known for mounting electronic devices to the control yokes of the aircraft. Yoke mounts are typically hard mounted (i.e., positioned at a fixed point in space) to the control yokes. That is, once mounted, the mount and the electronic information management device are immovable.

SUMMARY OF THE DISCLOSURE

An articulating yoke mount includes a support plate, a first bracket assembly mounted to the support plate, and a second bracket assembly spaced from the first bracket assembly. A positioning of the support plate is selectively adjustable relative to the first bracket assembly and the second bracket assembly to position the support plate at a desired viewing angle.

An aircraft control yoke assembly includes a control yoke, an articulating yoke mount mounted to said control yoke, and an electronic device. The articulating yoke mount is selectively adaptable over a range of approximately 90 degrees relative to the control yoke. The electronic device is received by the articulating yoke mount.

A method for mounting an electronic device to an aircraft control yoke includes mounting the electronic device to an articulating yoke mount, and pivoting the articulating yoke mount about a plurality of pivot axes to selectively adjust a positioning of the electronic device relative to the aircraft control yoke.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 illustrates portions of an example aircraft cockpit;

FIGS. 2A and 2B illustrate an example articulating yoke mount;

DETAILED DESCRIPTION OF THE DISCLOSED EMBODIMENT

Figure 3:
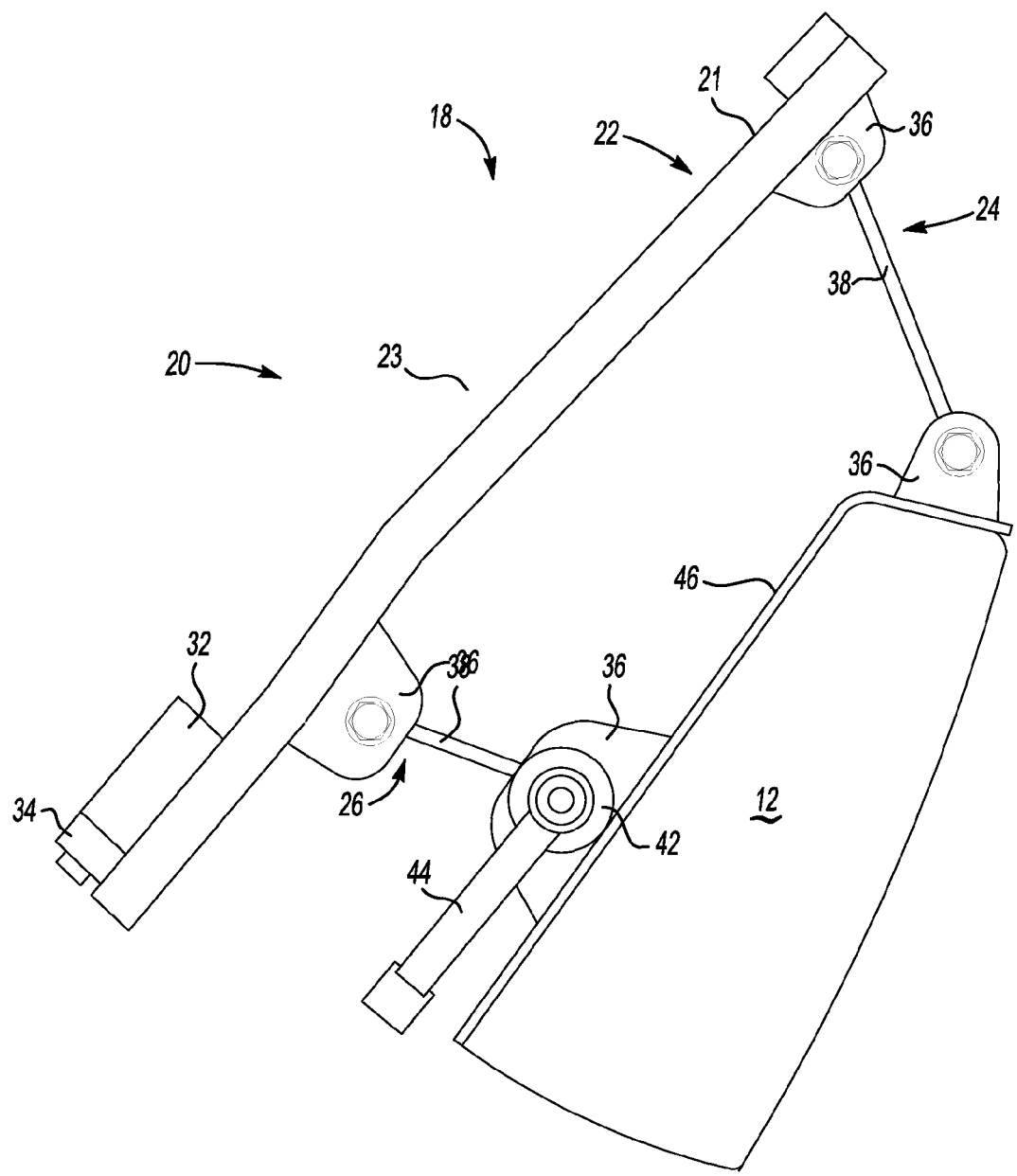
FIG. 3 illustrates an example adapter plate for use with the example articulating yoke mount illustrated in FIGS. 2A and 2B.

FIG. 1 illustrates portions of an aircraft cockpit 10 that includes an aircraft control yoke assembly 11. As known, an aircraft pilot utilizes a control yoke 12 of the aircraft control yoke assembly 11 to control the altitude of the aircraft. Although only a single control yoke 12 is illustrated, it should be understood that the aircraft cockpit 10 could include multiple aircraft control yokes. The control yoke 12 is generally connected to a control shaft 14 and includes one or more handles 16. The control shaft 14 may include an offset, a central, or any other control shaft configuration. Although a U-shaped handle 16 is illustrated, the handle 16 may take various configurations.

An example articulating yoke mount 18 of the aircraft control yoke assembly 11 is mounted to a portion of the control yoke 12. The articulating yoke mount 18 supports an electronic device 20 for displaying information to an aircraft pilot. In one example, the electronic device 20 includes an electronic flight bag. In another example, the electronic device 20 is an electronic information management device that includes an electronic display unit, such as a tablet PC, for displaying flight information to the aircraft pilot. It should be understood that any electronic device may be mounted by the articulating yoke mount 18. The example articulating yoke mount 18 is adjustable to modify a viewing angle of the electronic device 20 relative to the aircraft pilot, as is further discussed below.

FIGS. 2A and 2B illustrate numerous features of the example articulating yoke mount 18 referenced in FIG. 1. The articulating yoke mount 18 includes a support plate 22, a first bracket assembly 24 and a second bracket assembly 26. The support plate 22, the first bracket assembly 24 and the second bracket assembly 26 are aluminum, in one example. Other materials are contemplated as within the scope of this disclosure, and a worker of ordinary skill in the art would be able to select an appropriate material for these components.

In this example, the first bracket assembly 24 and the second bracket assembly 26 are positioned adjacent opposite ends 28, 30 of the support plate 22. In another example, the first bracket assembly 24 and the second bracket assembly 26 are positioned on opposite sides of a central axis C (FIG. 2A) of the support plate 22. That is, one bracket assembly 24, 26 is positioned on each half of the support plate 22. A worker of ordinary skill in the art would understand that the actual positioning of each bracket assembly 24, 26 could vary depending upon design specific parameters, including but not limited to, the type and configuration of the control yoke 12.

In this example, the support plate 22 includes a first plate piece 21 and a second plate piece 23. The first plate piece 21 and the second plate piece 23 are adjoined in a known manner to configure the support plate 22. Although the support plate 22 is illustrated as having two plate pieces, it should be understood that the support plate 22 may be comprised of a single plate piece (See FIG. 2B), or any number of plate pieces.

The support plate 22 includes a support ledge 32 positioned at the end 30 of the support plate 22. The support ledge 32 receives and supports the electronic device 20. In one example, the support plate 22 includes an electrical connector 25 for electrically connecting the electronic device 20 to the support plate 22. The electronic device 20 engages the support ledge 32 to electrically connect the components.

The support ledge 32 further includes a locking arm 34. The locking arm 34 is rotatable between a first position (shown in solid lines) and a second position (shown in phantom lines) to lock and unlock the electronic device 20 relative to the support plate 32. Although illustrated with a locking arm 34, it should be understood that the other locking mechanisms are contemplated as within the scope of this disclosure for removeably securing the electronic device 20 relative to the support plate 22 of the articulating yoke mount 18.

In this example, the first bracket assembly 24 and the second bracket assembly 26 include the same general design except where indicated otherwise. Each of the first bracket assembly 24 and the second bracket assembly 26 includes a pair of linkage brackets 36 and at least one linkage arm 38 that extends between each pair of linkage brackets 36. In this example, each linkage arm 38 is connected to each linkage bracket 36 via fasteners 40. The fasteners 40 are bolts secured with a nut 41, in one example.

The linkage brackets 36 each define a pivot axis A1, A2, A3 and A4, respectively. The pivot axes A1, A2, A3 and A4 extend along a longitudinal axis of the linkage bracket 36, and in this example extend along a longitudinal axis of each fastener 40. Therefore, the example articulating yoke mount 18 (and more particularly the linkage arms 38) is pivotable about each of the pivot axes A1 through A4 to position the electronic device 20 at a desired angle and positioning relative to the aircraft pilot. That is, in this example, the articulating yoke mount 18 is pivotable about each of four different axes. Rotation of the linkage arms 38 of the first bracket assembly 24 and the second bracket assembly 26 enables positioning of the support plate 22 (and therefore the electronic device 20) at a desired viewing angle relative to the aircraft pilot. In one example, the articulating yoke mount 18 provides approximately 180° of freedom for each linkage arm 38 to pivot about its respective pivot axes A1, A2, A3 and A4.

In the illustrated example, the linkage arms 38 are a single-piece arm. In another example, each linkage arm 38 includes a first arm linkage 38A and a second arm linkage 38B (See FIG. 1). Other designs are also contemplated as within the scope of this disclosure, including multi-link arms, or any other linkage configuration. The actual design of the linkage arms 38 will vary depending upon design specific parameters, including but not limited to, the type and configuration of the control yoke 12.

The second bracket assembly 26 includes a friction lock 42, in this example. In a locked position, the friction lock 42 prevents rotation of the linkage arms 38 about the pivot axes A3 and A4. Therefore, once locked, the articulating yoke mount 18 positions the electronic device 20 at a desired position. The friction lock 42 may be manually released by rotating a locking arm 44 of the friction lock 42. Alternatively, the first bracket assembly 24 could include the friction lock 42, or both the first bracket assembly 24 and the second bracket assembly 26 could include a friction lock 42.

Moreover, the friction lock 42 includes an override feature. In one example, the friction lock 42 is unlocked in response to overcoming a friction force generated by the friction lock 42 to allow rotation of the linkage arms 38 about axes A3 and A4. In this way, the support plate 22 is collapsible. For example, the aircraft pilot may generate a force with his/her hand by pushing on the support plate 22 of the articulating yoke mount 18 in a direction D4 (toward the control yoke 12) that is transverse to the support plate 22 (See FIG. 4C). Although illustrated as a friction lock, it should be understood that other locking devices for releaseably locking the articulating yoke mount 18 are contemplated as within the scope of this disclosure. The friction lock 42 eliminates the necessity of hard mounting the support plate 22.

The example articulating yoke mount 18 is a universal mount. That is, the articulating yoke mount 18 is mountable in any aircraft having any type of control yoke 12. To accomplish this, as illustrated in FIG. 3, the articulating yoke mount 18 includes an adapter plate 46 for mounting the articulating yoke mount 18 in a particular aircraft cockpit. The adapter plate 46 is positioned between the control yoke 12 and the articulating yoke mount 18. The size, shape and configuration of the adapter plate 46 could vary depending upon the type of control yoke 12 disposed within the aircraft, and this disclosure is not limited to an adapter plate having the specific design shown in FIG. 3.

For example, one linkage bracket 36 of each of the first bracket assembly 24 and the second bracket assembly 26 is mounted to the adapter plate 46 in a known manner at a desired position of the adapter plate 46 to accommodate a particular control yoke 12 design. The actual positioning of the first bracket assembly 24 and the second bracket assembly 26 relative to the adapter plate 46 will vary depending upon design parameters, including but not limited to, the type of control yoke 12 the articulating yoke mount 18 is mounted to. The adapter plate 46 is next mounted to the control yoke 12 in a known manner. Therefore, the example articulating yoke mount 18 is mountable within any known aircraft cockpit.

Figure 4A:
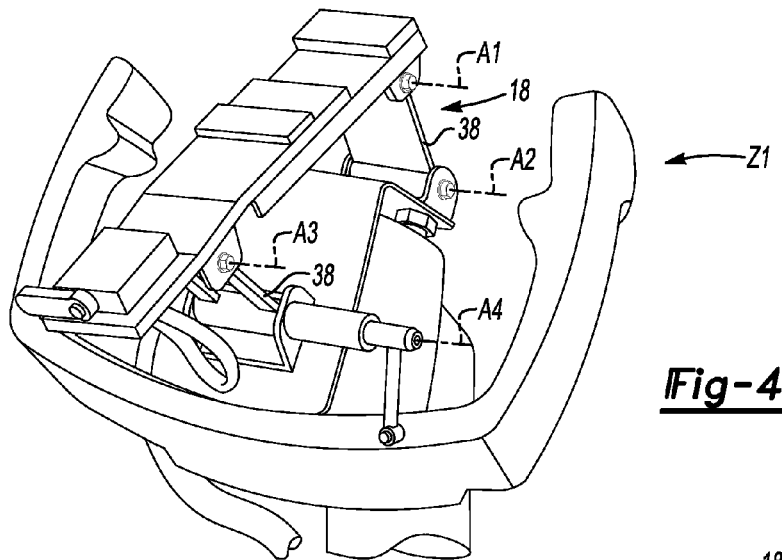
FIG. 4A illustrates a first position of an example articulating yoke mount.

FIG. 4A illustrates a first example positioning Z1 of the articulating yoke mount 18. In this example, the positioning Z1 is a viewing position. The aircraft pilot positions the articulating yoke mount 18 at a desired position by rotating the linkage arms 38 about the pivot axes A1, A2, A3 and A4 to position the electronic device 20 at a desired viewing angle relative to the aircraft pilot. In this example, the position Z1 is used during normal flight operation.

Figure 4B:
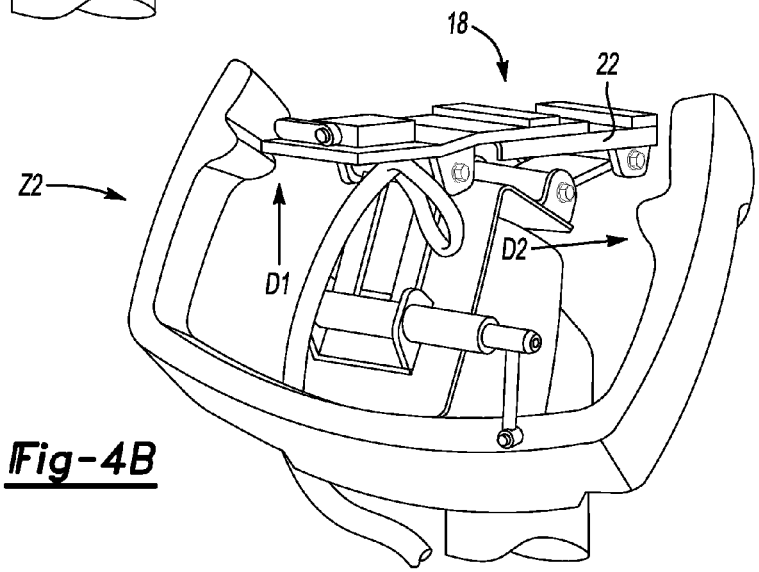
FIG. 4B illustrates a second position of an example articulating yoke mount.

FIG. 4B illustrates another example position Z2 of the articulating yoke mount 18. In this example, the articulating yoke mount 18 is positioned at a full up and over position, or ingress/egress position. That is, the articulating yoke mount 18 is positioned at the Z2 position shown in FIG. 4B to facilitate entrance/exit to/from the aircraft pilot chair by the aircraft pilot. The support plate 22 is moveable generally in a first direction D1 (i.e., generally transverse to the support plate 22) and a second direction D2 (i.e., generally parallel to the support plate 22) to position the articulating yoke mount 18 in the ingress/egress position Z2.

Figure 4C:
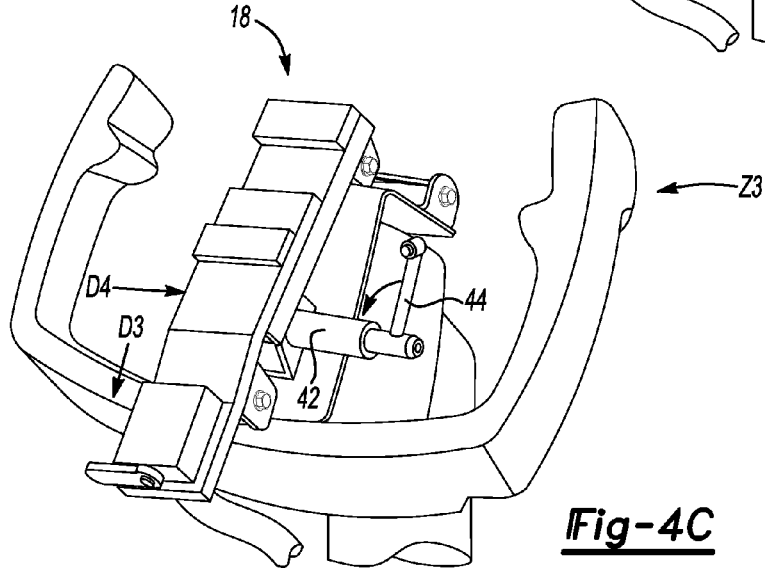
FIG. 4C illustrates yet another positioning of an example articulating yoke mount.

FIG. 4C illustrates yet another example positioning Z3 of the articulating yoke mount 18. In this example, the position Z3 represents a collapsed position. A collapsed position may be required during takeoff and/or landing, for example. In another example, the collapsed position is required during extreme maneuvering of the aircraft. The articulating yoke mount 18 is easily collapsed by overcoming the force of the friction lock 42. The friction force of the friction lock 42 is overcome by communicating a force that is transverse to the support plate 22 (i.e., in the direction D4).

In another example, the collapsed position is achieved by rotating the locking arm 44 of the friction lock 42 and pulling on the support plate 22 generally in a direction D3 (i.e., parallel to the support plate 22). The linkage arms 38 of the first bracket assembly 24 and the second bracket assembly 26 rotate about the pivot axes A1, A2, A3 and A4 to position the articulating yoke mount 18 in the collapsed position.

Although only three positions Z1 through Z3 are illustrated, it should be understood that the articulating yoke mount 18 is adjustable to accommodate any desired viewing angle of the aircraft pilot. The example articulating yoke mount 18 is adjustable over a range between approximately 0° (as depicted in FIG. 4C) and 90° (as depicted in FIG. 4B) relative to the control yoke 12, in this example. Exceptional readability of the electronic device 20 in all cockpit ambient light conditions is therefore provided by the articulating yoke mount 18.

The foregoing description shall be interpreted as illustrative and not in any limiting sense. A worker of ordinary skill in the art having the benefit of this disclosure would recognize that certain modifications would come within the scope of this disclosure. For these reasons, the following claims should be studied to determine the true scope and content of this disclosure.

What is claimed is:

1. An articulating yoke mount, comprising:
   a support plate;
   a first bracket assembly mounted to said support plate; and
   a second bracket assembly spaced from said first bracket assembly, wherein a positioning of said support plate is selectively adjustable relative to said first bracket assembly and said second bracket assembly to position said support plate at a desired viewing angle.

2. The mount as recited in claim 1, wherein said support plate includes a first plate piece and a second plate piece.

3. The mount as recited in claim 1, wherein said support plate includes a single-plate piece.

4. The mount as recited in claim 1, comprising a support ledge positioned at an end of said support plate.

5. The mount as recited in claim 1, wherein said first bracket assembly and said second bracket assembly each include a first linkage bracket, a second linkage bracket and at least one linkage arm.

6. The mount as recited in claim 5, wherein said at least one linkage arm includes multiple linkage arms.

7. The mount as recited in claim 5, wherein said first linkage bracket defines a first pivot axis and said second linkage bracket defines a second pivot axis, wherein said at least one linkage arm is pivotable about said first pivot axis and said second pivot axis to position said support plate at said desired viewing angle.

8. The mount as recited in claim 1, wherein one of said first bracket assembly and said second bracket assembly includes a friction lock.

9. The mount as recited in claim 8, wherein said support plate is collapsible in response to overcoming a friction force of said friction lock.

10. An aircraft control yoke assembly, comprising:
    a control yoke;
    an articulating yoke mount mounted to said control yoke, wherein said articulating yoke mount is selectively adaptable over a range of approximately 90 degrees relative to said control yoke; and
    an electronic device received by said articulating yoke mount, wherein said articulating yoke mount includes a support plate, a first bracket assembly and a second bracket assembly.

11. The assembly as recited in claim 10, wherein said support plate is selectively adjustable over said range relative to said control yoke to position said support plate at a desired viewing angle.

12. The assembly as recited in claim 10, wherein each of said first bracket assembly and said second bracket assembly define a first pivot axis and a second pivot axis, and said support plate is adjustable over said range by pivoting about said first pivot axes and said second pivot axes.

13. The assembly as recited in claim 10, wherein said electronic device is an electronic flight bag.

14. The assembly as recited in claim 10, comprising an adapter plate positioned between said control yoke and said articulating yoke mount.

15. A method for mounting an electronic device to an aircraft control yoke, comprising the steps of:
    a) mounting the electronic device to an articulating yoke mount, and
    b) pivoting the articulating yoke mount about a plurality of pivot axes to selectively adjust a positioning of the electronic device relative to the aircraft control yoke, wherein said articulating yoke mount includes a support plate, a first bracket assembly and a second bracket assembly.

16. The method as recited in claim 15, comprising the steps of:
    c) mounting an adapter plate to the aircraft control yoke; and
    d) attaching the articulating yoke mount to the adapter plate.

17. The method as recited in claim 15, wherein the articulating yoke mount includes a support plate and comprising the step of:
    c) communicating a force in a direction transverse to the support plate to collapse the articulating yoke mount.

\* \* \* \* \*